July 7, 1942.    E. G. SIMPSON    2,288,925
DECK LID PROP
Filed May 12, 1941    4 Sheets-Sheet 1

INVENTOR.
Emory Glenn Simpson
BY Barnes, Kisselle, Laughlin & Raisch
ATTORNEYS

July 7, 1942.  E. G. SIMPSON  2,288,925
DECK LID PROP
Filed May 12, 1941  4 Sheets-Sheet 2
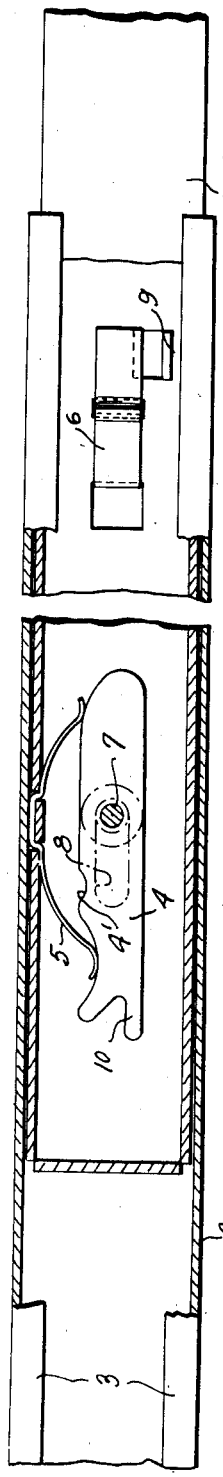
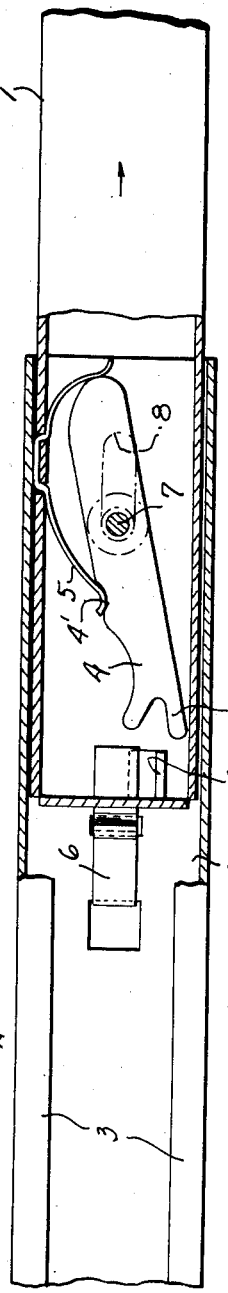
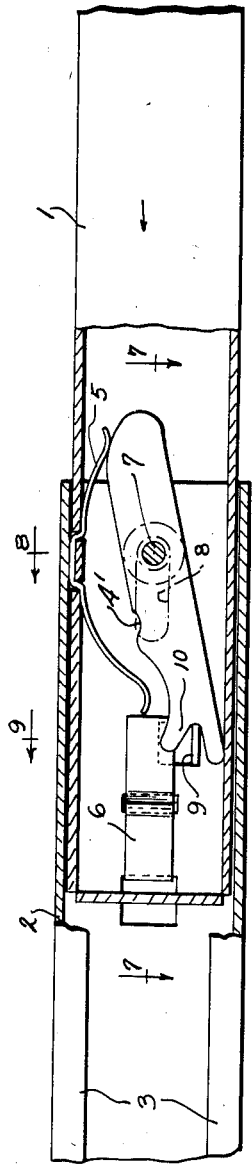
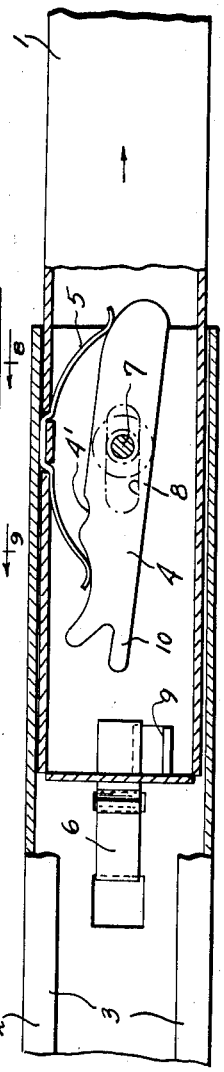
INVENTOR.
Emory Glenn Simpson
BY
ATTORNEYS July 7, 1942.   E. G. SIMPSON   2,288,925
DECK LID PROP
Filed May 12, 1941   4 Sheets-Sheet 3

INVENTOR.
Emory Glenn Simpson
BY
Barnes, Kisselle, Laughlin & Raisch
ATTORNEYS.

July 7, 1942.     E. G. SIMPSON     2,288,925
DECK LID PROP
Filed May 12, 1941     4 Sheets-Sheet 4
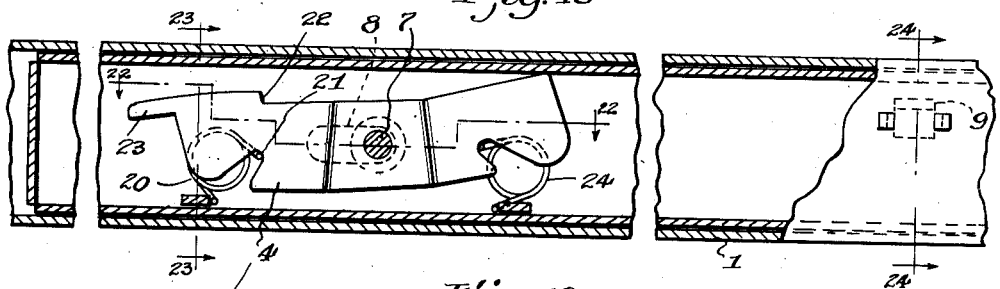
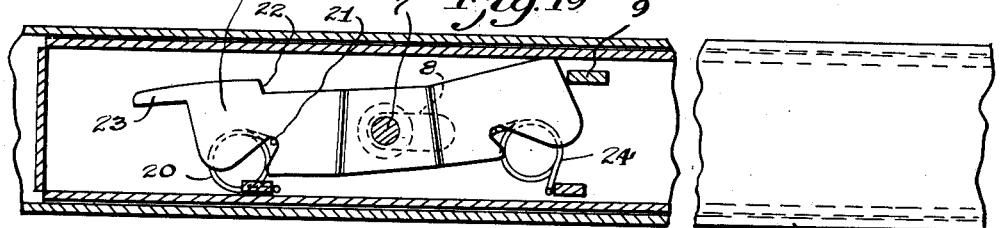
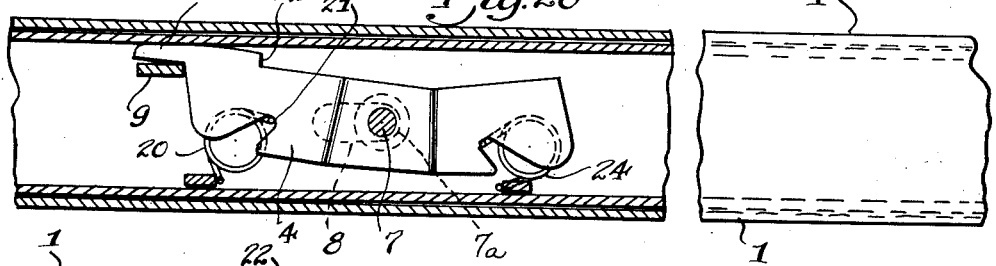
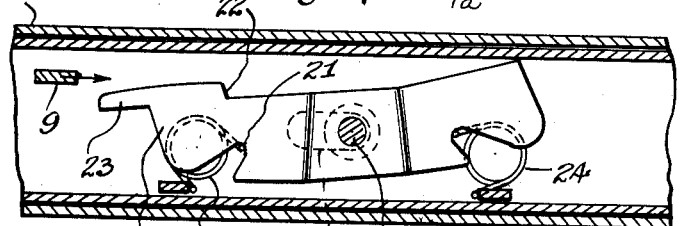
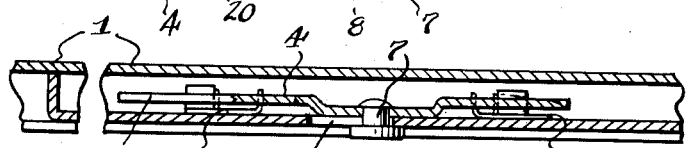
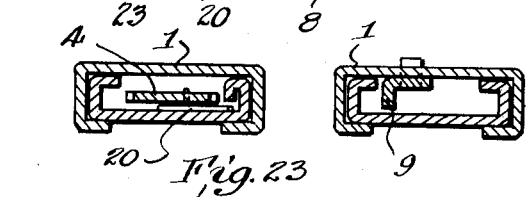
INVENTOR.
Emory Glenn Simpson
BY Barnes, Kisselle, Laughlin and Raisch
Attorneys.

Patented July 7, 1942

2,288,925

UNITED STATES PATENT OFFICE 2,288,925

DECK LID PROP

Emory Glenn Simpson, Detroit, Mich., assignor to Ternstedt Manufacturing Company, Detroit, Mich., a corporation of Michigan Application May 12, 1941, Serial No. 393,082

8 Claims. (Cl. 217—60)

This invention relates to props and especially a prop for supporting a rear deck lid of an automobile body. It is desirable to have a prop in which the two parts telescope and various designs have already been proposed. They take the form of a device for kicking a latching member around by a pair of abutments so as to make it first latch when the lid is lifted and then, when the lid is lifted a second time, throw the latch free so as to drop the lid. Some of the other prior art takes the form of a switching arrangement or island guide by which the latch is guided up one side of the island in raising the lid and then, on a second raising of the lid, is guided down the other side of the island.

I propose quite a different arrangement and mode of operation in which the latching member is shifted with respect to a spring or springs so that, in the first raising of the lid, the spring or springs stress the latch to throw it into locking position and, on the second raising of the lid, stress the latch to throw it out of locking position. This application is a continuation in part of my prior application 133,892, filed March 30, 1937.

In the drawings:

Fig. 3 is a view, largely in longitudinal section, of one form in collapsed position.

Fig. 4 is a similar view showing the latch shifted to prepare the same for snapping into locking position.

Fig. 5 is a similar view showing the latch in locking position, but shifted to snap to non-locking position when the lid is raised a second time.

Fig. 6 is a similar view showing the latch in the position assumed as the lid is lowered.

Figs. 18 to 24 inclusive are views of another modified form of the invention.

Figure 1:
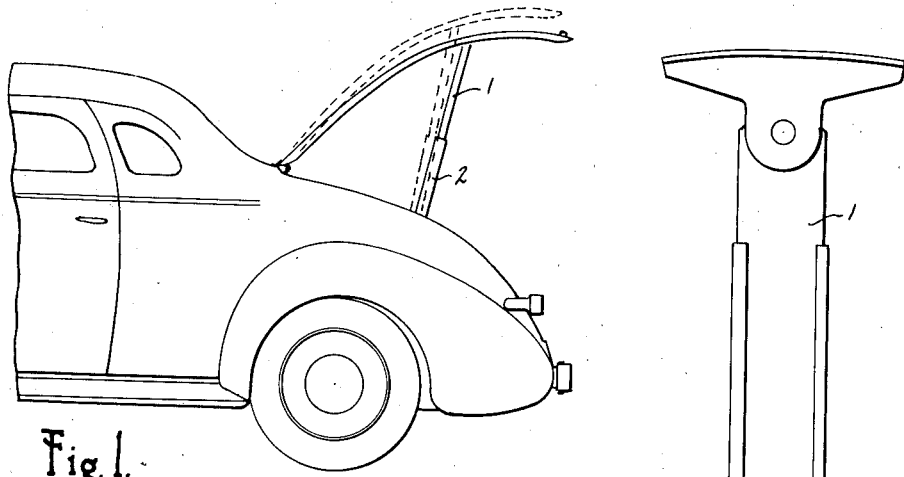
Fig. 1 is a side elevation of the rear of a coupe showing the prop supporting a deck lid.
Figure 7:
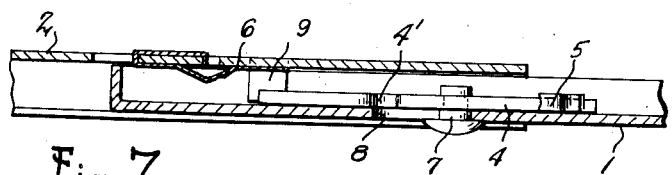
Figs. 7, 8 and 9 are sections on the corresponding section lines of Fig. 5.
Figure 8:
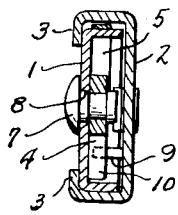
Figure 9:
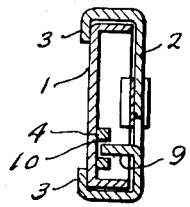
Figure 10:
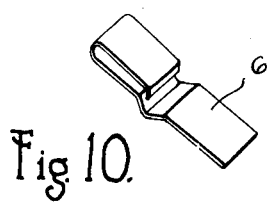
Fig. 10 is a detail of the drag device.
Figure 2:
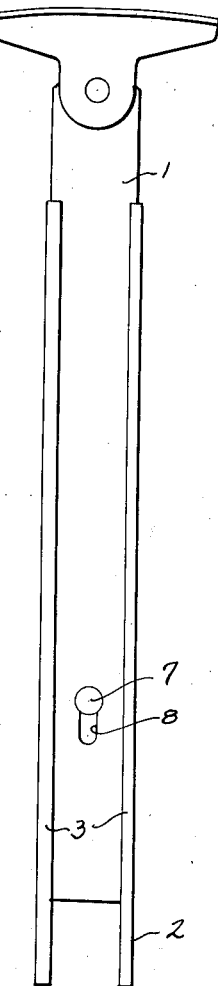
Fig. 2 is an elevation of the prop.
Figure 11:
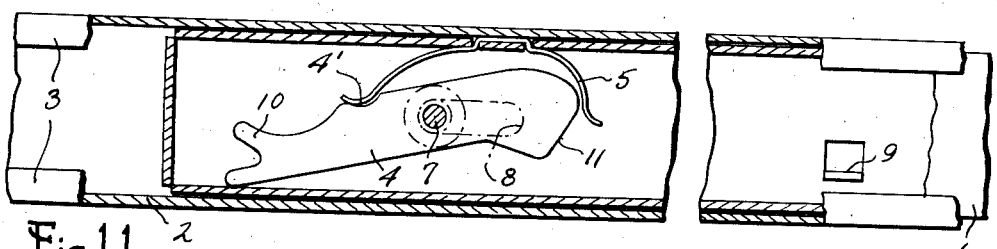
Figs. 11, 12, 13 and 14 are views of a modified form in the various positions of the latch.

I designates the upper prop section, and 2 the lower prop section which has a flange 3 by which the two sections are held in telescoping relation. Both sections are channels. In Fig. 3, the latch 4 is in neutral position stressed by the two ends of the bowed spring 5. As the lid is lifted and the upper section 2 is drawn up, latch 4 encounters the drag spring 6, detailed in Fig. 10. This holds back the latch while the telescoping section I continues to rise. This shifts the latch which has relative movement by reason of the pin and slot connection 7 and 8 with the upper section I. The latch shifts to the position shown in Fig. 4, bringing the lower end of the spring 5 in the notch 4' and stressing only the lower end of the latch. Hence, when the latch rises above the rest 9 (struck out lug), the latch snaps to the position of Fig. 4 locating the forked end 10 above the rest. Hence, when the lid is dropped down, the forked end of the latch straddles the rest, as shown in Fig. 5, and the prop locks the lid in the open position. When the latch straddles the rest 9, the weight of the lid comes down on the latch and continues to move after the latch is at rest until the pin 7, moving in slot 8, stops further movement of the lid. This shifts the latch with respect to spring 5, bringing the upper end of the spring alone in contact with the latch and stressing only the upper arm of the latch. Consequently, as soon as the lid is lifted a second time, the latch automatically snaps out of the path of the rest 9 and clears the rest as the lid is dropped.

Figure 12:
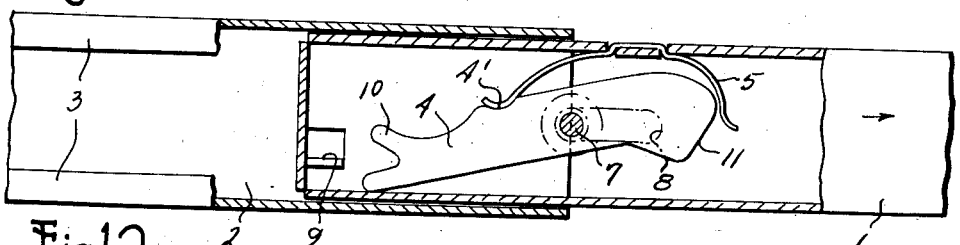
Figure 13:
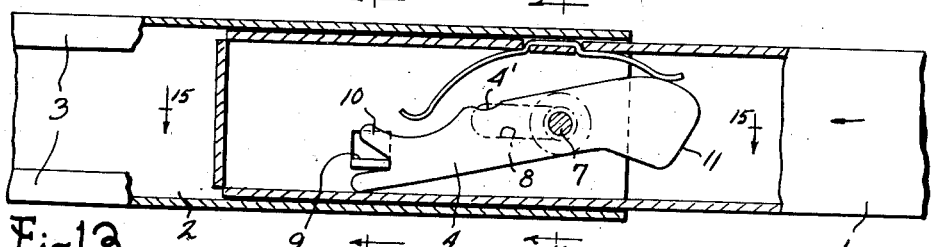
Figure 14:
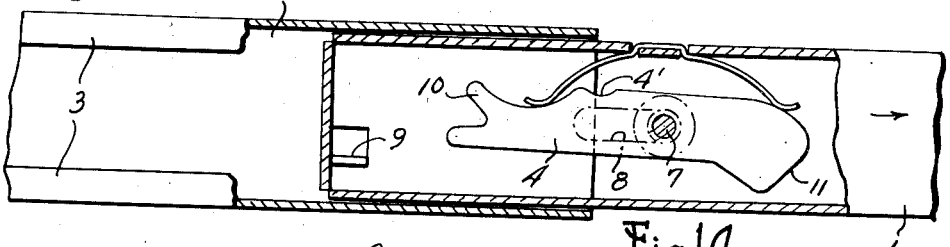
Figure 15:
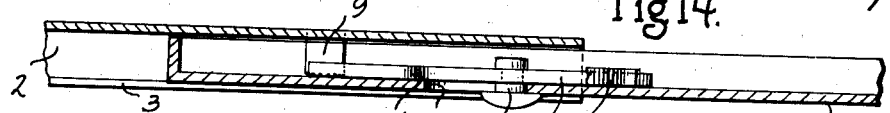
Figs. 15, 16 and 17 are sections on the corresponding section lines of Fig. 12.
Figure 16:
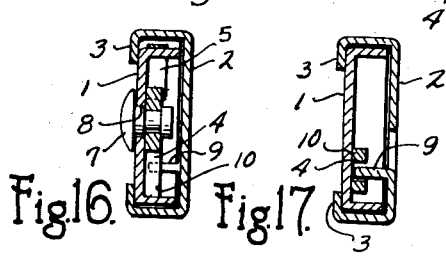
Figure 17:
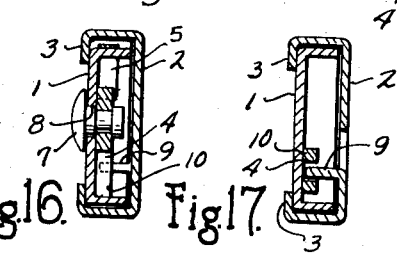

In the modified form shown in Figs. 11–17, a similar mode of operation is had. The upper end of the latch is provided with an inclined face or cam 11. Instead of the latch encountering a drag element, as with the first form, the cam 11 encounters the upper end of the lug or rest 9. This temporarily holds up the latch and permits shifting of the latch with respect to the spring, as the sections are contracted. This puts the latch in the position shown in Fig. 11 in which position the tail of the latch can snap by the rest 9 when the sections are extended and still be in position, as shown in Fig. 12, to drop onto the rest, as shown in Fig. 13, when the lid is dropped slightly. When the weight of the lid is allowed to drop back, the latch and the pivots shift, as shown in Fig. 13, so that the spring stresses the upper end of the latch to throw it to the position shown in Fig. 14. In this position, when the sections are allowed to contract, the cam 11 strikes the upper end of rest 9 and it temporarily holds the latch so that the latch shifts from the position shown in Fig. 14 with respect to the spring to the position shown in Fig. 11. In this position, as already stated, the latch is in position to drop into engaging position with the rest when the parts are again extended.

In the modification shown in Figs. 18 to 24 inclusive, instead of the latch shifting with respect to the contact point of the spring, the latch shifts with respect to two springs so as to make one spring ineffective to swing the latch about its pivot and the other effective so to do. In Fig. 18 the latch is shown in the position it occupies when the prop sections are contracted. As the latch 4 reaches the rest 9 when the sections are extended, as shown in Fig. 19, the latch is held up and causes the pivot pin 7 to shift from the top of the slot, as shown in Fig. 18, to the bottom of the slot, as shown in Fig. 19. Here the coil spring 20 bears against the lower end of the latch 8 at the point 21 and is in a position to swing the latch clockwise around its pivot, as is shown in Fig. 20. If, by reason of the quickness in which the parts are extended or otherwise, the encounter of the head of the latch with the rest 9, as shown in Fig. 19, is not entirely effective to make the full shift of the latch, then the rest 9 will encounter shoulder 22 on the tail of the latch and insure the full shift. After the latch passes the rest, the latch is swung counter-clockwise and the tail piece 23 of the latch is now free to drop in behind the rest, as shown in Fig. 20, when the lid is dropped slightly after being fully raised. This locks the parts together. When the latch is hooked behind the rest 9, as shown in Fig. 20, and the weight of the deck lid comes on the upper prop section, this shifts the pivot member 7 from the upper to the lower portion of the slot, as shown in Fig. 19, to the upper portion of the slot, as shown at 7a in Fig. 20. Really, the slot and the upper prop section 1 shifts with respect to the latch which is still locked in its engagement with the rest 9. In this shifted position, the spring 24 now stresses the upper end of the latch to turn it counter-clockwise while the spring 20 stresses the latch on the other side of the center line from what is the line of stress in the latch shown in Fig. 21. Hence, as soon as the lid is lifted preparatory to dropping the same, the latch, as soon as it is released from the rest 9, swings counter-clockwise to the position shown in Fig. 21 and now, as the lid is dropped, the latch will pass freely by the rest so that the sections can be contracted. When the lid is again raised, as already explained, the latch encounters the rest 9 shifting the latch to the position shown in Fig. 20, where it is free to drop again behind the rest 9 and lock the parts together.

What I claim is:

1. In a prop, the combination of two sections slidable with respect to each other to extend and contract, one of the sections having a bodily shiftable latch, the other section a rest, a spring on the section supporting the latch and means for encountering the latch to first shift it bodily with respect to the spring so that the spring stresses the latch to force it into the path of the rest so that it can interlock with the rest upon the dropping of the weight of the supported element which again shifts the latch with respect to the spring to cause the spring to stress the latch in a different place to snap it out of engagement with the rest when the sections are again extended preparatory to dropping them together so that the latch will be out of the path of the rest in contracting the sections together.

2. In a prop, the combination of two sections slidable with respect to each other to extend and contract, one of the sections having a shiftable latch, the other section a rest, a spring on the section supporting the latch and a yielding drag member for encountering the latch to first shift it with respect to the spring so that the spring stresses the latch to force it into the path of the rest so that it can interlock with the rest upon the dropping of the weight of the supported element and thereby again shifting the latch with respect to the spring to cause the spring to stress the latch to snap it out of engagement with the rest when the sections are again extended preparatory to dropping one section so that the latch will be out of the path of the rest in contracting the sections together.

3. In a prop, the combination of two sections slidable with respect to each other, one of the sections having a bodily shiftable latch, the other section a rest, a spring on the section supporting the latch and means for encountering the latch to first shift it bodily with respect to the spring so that the spring stresses the latch in a place on the latch to force it into the path of the rest so that it can interlock with the rest upon the dropping of the weight of the supported element and again shifting the latch with respect to the spring to cause the spring to stress the latch in a different place to snap it out of engagement with the rest when the sections are again extended preparing to dropping them together so that the latch will be out of the path of the rest in drawing the sections together, one side of the rest encountering the end of the latch to do the first mentioned shifting.

4. In a prop, a pair of movable sections telescoping relative to each other to extended or contracted positions and means for locking the prop sections in the extended position, comprising a latch member supported on a shiftable pivot on one section and a rest on the other section, the latch member on the first extension of the sections arranged by reason of shifting with said pivot to snap into position to engage the rest and on extending the sections a second time to release the latch which is arranged to snap out of the path of engagement with the rest member to permit the contraction of the sections.

5. In a deck lid support or the like, the combination of a pair of prop sections guided to slide one on the other, a rest upon one section, a latch pivoted on the other section and bodily slidable on said section, spring means for stressing said latch, said latch when the sections are extended being shifted longitudinally of its section so that the spring means stresses the latch to swing it in position to catch the rest and lock therewith when the sections are slightly contracted after full extension, the weight of the supported member when released serving to shift the latch again bodily and longitudinally of the section so that the spring means is ready to swing the latch to a position to clear the rest when the sections are again extended and then contracted, the said latch in relative movement of the sections before the latch locks with the rest again being struck to again shift the latch longitudinally of the section whereby the spring means stresses the latch to swing it to a position to lock with the rest when again dropped thereupon.

6. In a deck lid support or the like, the combination of a pair of prop sections guided to slide one on the other, a rest upon one section, a latch pivoted on the other section and bodily slidable on said section, spring means for stressing said latch, said latch when the sections are extended being shifted longitudinally of its section so that the spring means stresses the latch to swing it in position to catch the rest and lock therewith when the sections are slightly contracted after full extension, the weight of the supported member when released serving to shift the latch again bodily and longitudinally of the section so that the spring means is ready to swing the latch to a position to clear the rest when the sections are again extended and then contracted, the said latch in relative movement of the sections before the latch locks with the rest again being struck by the rest to again shift the latch longitudinally of the section whereby the spring means stresses the latch to swing it to a position to lock with the rest when again dropped thereupon.

7. In a deck lid support or the like, the combination of a pair of prop sections guided to slide one on the other, a rest upon one section, a latch pivoted on the other section and bodily slidable on said section, spring means for stressing said latch, said latch when the sections are extended being shifted longitudinally of its section so that the spring means stresses the latch to swing it in position to catch the rest and lock therewith when the sections are slightly contracted after full extension, the weight of the supported member when released serving to shift the latch again bodily and longitudinally of the section so that the spring means is ready to swing the latch to a position to clear the rest when the sections are again extended and then contracted, the said latch in relative movement of the sections before the latch locks with the rest again being struck to again shift the latch longitudinally of the section whereby the spring means stresses the latch to swing it to a position to lock with the rest when again dropped thereupon, the said spring means comprising two independent clock type springs one positioned adjacent to and stressing each end of the latch, and which in one position of bodily shift of the latch are arranged to swing the latch clockwise and in the other position of shift to turn the latch counter-clockwise.

8. In a deck lid support or the like, the combination of a pair of prop sections guided to slide one on the other, a rest upon one section, a latch pivoted on the other section and bodily slidable on said section, spring means for stressing said latch, said latch when the sections are extended being shifted longitudinally of its section so that the spring means stresses the latch to swing it in position to catch the rest and lock therewith when the sections are slightly contracted after full extension, the weight of the supported member when released serving to shift the latch again bodily and longitudinally of the section so that the spring means is ready to swing the latch to a position to clear the rest when the sections are again extended and then contracted, the said latch in relative movement of the sections before the latch locks with the rest again being struck to again shift the latch longitudinally of the section whereby the spring means stresses the latch to swing it to a position to lock with the rest when again dropped thereupon, the said spring means comprising two separate and independent springs one positioned adjacent to and stressing each end of the latch, and which in one position of bodily shift of the latch are arranged to swing the latch clockwise and in the other position of shift to turn the latch counter-clockwise, said springs being shifted both over with respect to center lines of thrust by shifting of the latch bodily on its section and thereby changing the direction of thrust on the latch from clockwise to counter-clockwise or conversely.

EMORY GLENN SIMPSON.